(12) United States Patent
Yang

(10) Patent No.: US 9,822,827 B2
(45) Date of Patent: Nov. 21, 2017

(54) SADDLE-RIDE TYPE VEHICULAR DRY CLUTCH HAVING PASSIVE CLUTCH DISC OF CO-AXIAL FIXED PLANE CONTACT

(71) Applicant: Yu-Hsiu Yang, New Taipei (TW)

(72) Inventor: Yu-Hsiu Yang, New Taipei (TW)

( * ) Notice: Subject to any disclaimer, the term of this patent is extended or adjusted under 35 U.S.C. 154(b) by 0 days.

(21) Appl. No.: 15/133,853

(22) Filed: Apr. 20, 2016

(65) Prior Publication Data

US 2016/0312841 A1    Oct. 27, 2016

(30) Foreign Application Priority Data

Apr. 24, 2015   (TW) .............................. 104113320 A

(51) Int. Cl.
*F16D 43/14*  (2006.01)
*F16D 43/10*  (2006.01)

(52) U.S. Cl.
CPC .............. *F16D 43/10* (2013.01); *F16D 43/14* (2013.01)

(58) Field of Classification Search
None
See application file for complete search history.

(56) References Cited

U.S. PATENT DOCUMENTS

| | | | | |
|---|---|---|---|---|
| 1,678,638 | A * | 7/1928 | Dunham | F16D 43/10 192/105 B |
| 6,422,371 | B1 * | 7/2002 | Naraki | F16D 43/10 192/105 C |
| 8,210,333 | B2 * | 7/2012 | Inomori | F16D 25/086 192/105 B |
| 8,317,009 | B2 * | 11/2012 | Inomori | F16D 25/086 192/105 B |
| 2003/0010594 | A1 * | 1/2003 | Howell | F16D 43/18 192/76 |

\* cited by examiner

*Primary Examiner* — Mark A Manley
(74) *Attorney, Agent, or Firm* — Wang Law Firm, Inc.

(57) ABSTRACT

A saddle ride type vehicular dry clutch having passive clutch disc of co-axial fixed plane contact, used for seamlessly undertaking the drives from the drive bearing assembly, in which the drive bearing assembly includes a bearing body and an active disc, and the saddle ride type vehicular dry clutch comprises: a clutch device, including a drive axle body formed with a central through-hole, having non-planar guiding slide grooves and an axle body perimeter edge remote from the central through-hole; a passive clutch disc, having a contact surface and a friction drive surface, and assembly ports for assembling elastic components outside of the engage drive area; centrifugal rollers, accommodated within the non-planar guiding slide grooves; and the driven devices includes a drive disc, formed with radially symmetric drive snap ports; a clutch shell, having a tubular inner wall, a surrounding outer wall and a connection wall.

8 Claims, 8 Drawing Sheets

SADDLE-RIDE TYPE VEHICULAR DRY CLUTCH HAVING PASSIVE CLUTCH DISC OF CO-AXIAL FIXED PLANE CONTACT

FIELD OF THE INVENTION

A saddle ride type vehicular dry clutch having passive clutch disc of co-axial fixed plane contact enabling applications on the seamless speed change system of general motor vehicles is disclosed.

BACKGROUND OF THE INVENTION

The clutch is a type of device for transferring power from the mechanic engine of an automobile, a motorcycle or other power sources to the wheel shaft of the automobile in an attach-detach fashion, which can be typically categorized into so-called dry clutches and wet clutches, and the structural differences between them are that the wet clutch is installed in a sealed oil chamber, while the dry clutch can be placed in a ventilated, dry environment. According to currently available crafts for automobile fabrications, such two sorts of clutches have their respective advantages, in which the wet clutch may have an extended life span through engine oil lubrications thus lowering the heat and abrasions caused by frictions; however, the wet clutch may be accompanied by significantly higher costs and greater structural sizes.

Contrarily, the dry clutch needs not to be immersed in the engine oil, thus allowing more direct and acute power transmissions, also enabling more powerful torque and acceleration than the wet clutch; besides, since the drive disc and the passive disc are not placed in the engine oil, these two components may be conveniently taken apart in absence of viscosity of the engine oil, thus eliminating the requirement on the separation elastic plate additionally installed for ensuring the separation between the drive disc and the passive disc and preventing the risk of clutch deadlock problems, also further simplifying the integral structure of the clutch; whereas, it should be known the lack of engine oil lubrication may cause relatively greater abrasions in the drive disc and the passive disc, so the life span thereof could be shortened to a notable extent; in particular, the increased torque may lead to the slip issue in case of uneven force distributions. Therefore, through the above-said comparisons, it can be appreciated that, although the objectives of the dry and the wet clutches may be essentially the same, their structures may be two parallel solutions, not mutually compliant, and no room for parts of such structures to exhibit the possible existence of collaborative mixture.

One type of common dry clutch applicable for motorcycles can be referred to FIG. 1. When a user presses down the accelerator to initialize, the transmission component 15 drives the dry clutch 1 to spin synchronously, and, upon reaching at a predetermined rotation speed (typically about 3000 rotations per minute (RPM)), the three clutch counter-weights 11 in the dry clutch 1 may overcome the flexibility restriction from the springs 12 by means of inertial reaction force (commonly referred as the centrifugal force) and be flung outwardly such that the linings 13 on these clutch counter-weights 11 may gradually engage and abut closely to the clutch shell 14 to rotate at the same pace thereby driving the vehicle to move forward. However, due to long-termed and repeated abrasive driving, the extent of elastic fatigue occurring on each of the springs 12 may not be identical, thus leading to variations in terms of fling time, distance etc. on each of the clutch counter-weights 11.

Accordingly, because of such accumulations, the differences in abrasions among such three linings 13 set forth in the present instance may become more significant. Suppose one of them gradually fails, i.e., simply a smaller area thereof may engage with the clutch shell 14 rather than a complete attachment, the drive efficiency applied on the clutch shell 14 through the drive synchronous rotations may be undesirably reduced, or even causing instability problems in the intended conjunctive movement effect.

Accordingly, those skilled ones in the art proposed certain improvements with regards to the aforementioned issues found on the dry clutches, in which the coordinate structure configured between the clutch counter-weights and the springs is removed, as illustrated in FIG. 2, and alternatively a push-up disc 22 to be squeezed and pressed by the centrifugal rollers 21 installed on the disc (not denoted) is applied. During the squeezing and pressing process, the springs 23 are coerced to be retracted tightly such that the block-wise linings 24 set up on the push-up disc 22 can rise up toward the up direction in the plane of the Figure so as to frictionally engage with the clutch shell 25 thereby driving the clutch shell 25 to rotate for power transmissions. However, the torque transmission achieved by such a design is essentially undertaken entirely by one single columnar guide pin 231, so that in case the engine has been initiated to rotate, not reaching at a predetermined rotation speed yet, the clutch shell 25 is not driven, but the lower end of the columnar guide pin 231 for stabilizing the spring 23 may be subject to the torque first; on the contrary, the upper end thereof may be synchronized to the clutch shell 25 and unable to move, thus two opposite drive directions on such two ends may lead to synchronous rotation failures. Upon slowing down, the rotation speed of the wheels can be reduced by the braking effect, so the columnar guide pin 231 has to be subject to another torque of non-synchronous speeds once again.

After long-termed use, since the torque may be variant and intermittent, suppose certain portions around the upper and lower ends on the columnar guide pin 231 do have material non-uniformity problems, fissures may appear in such portions due to stress concentrations, or even probably leading to serious breakage or fracture on the integral structure; in case the fractures do occur, the synchronous operation of the dry clutch may abruptly stop, resulting in void engine operation and power failures for the automobile, thus causing tremendous vehicular cruise risk. Moreover, as shown in the Figure, seeing that the block-wise linings 24 move upwardly and come into direct contact with the clutch shell 25, the heat energy generated by mutual frictions may be accumulated on the clutch shell 25, and the damages to the structure of the clutch shell 25 resulting from such repeated expansion-retraction processes caused by heat energy fluctuations may be quite difficult to measure, thus greatly shortening the life span of the dry clutch.

Based on the aforementioned drawbacks explained in the prior art structural improvements, the present invention provides a saddle ride type vehicular dry clutch having passive clutch disc of co-axial fixed plane contact, in which the drive bearing assembly follows the power transmissions from a belt to continuously rotate, and when the rotation speed achieves a certain specific value, the radially allocated centrifugal rollers may be flung outwardly and abut tightly and engage with the passive clutch disc which further contacts the friction drive disc. Since such two elements are jointed by a surface engagement of large areas, it is possible to effectively resolve the uneven lining contact surface issue and eliminate the coordinate structure using springs for controlling the fling distance of clutch counter-weights, thus avoiding the elasticity aging problem which may adversely affect the feature of uniform power transmissions. Once the drive disc starts to rotate synchronously, the clutch shell can acquire the needed power for rotations through transmissions of the fixation parts snap fixed with the drive snap ports, and further drive the for output axle with the acquired power by means of the central occlusive hole thus enabling the operations of the mechanic power equipment. In addition, since the friction engagement objects are altered from the previous linings (equivalent to the above-said drive disc) and the clutch shell to the passive clutch disc and the drive disc, the direct frictional contact to the clutch shell may be reduced thus lowering the possibility of structure damages due to physical effects such as expansion-retraction phenomenon or the like. Besides, the installation positions for springs have been ameliorated so as to prevent the fracture problem in the aforementioned columnar guide pin because of stresses, thereby extending the life span of the entire dry clutch and maintaining the power transmission efficiency. Thus the major features of the present invention are illustrated.

SUMMARY OF THE INVENTION

An objective of the present invention is to provide a saddle ride type vehicular dry clutch having passive clutch disc of co-axial fixed plane contact, which employs the surface engagement of large areas for power transmissions thereby improving the utilization area of frictional driving and maintaining the power transmission efficiency.

Another objective of the present invention is to provide a saddle ride type vehicular dry clutch having passive clutch disc of co-axial fixed plane contact, which, through changing the frictional engagement objects, prevents the heat generated by frictions from accumulating on the clutch shell so as to prolong the life span of the integral clutch.

Yet another objective of the present invention is to provide a saddle ride type vehicular dry clutch having passive clutch disc of co-axial fixed plane contact, which, based on the surface engagement transmission, the torque can be undertaken by the contact area on the entire disc thereby eliminating the risk of stress concentration frequently occurring on the columnar guide pins in prior art so as to enhance the security of the clutch.

Accordingly, to achieve the objectives as previously set forth, the present invention discloses a saddle ride type vehicular dry clutch having passive clutch disc of co-axial fixed plane contact, used for seamlessly undertaking the drives from the drive bearing assembly, in which the drive bearing assembly includes a bearing body and an active disc, and the saddle ride type vehicular dry clutch comprises: a clutch device, including a drive axle body formed with a central through-hole, having non-planar guiding slide grooves and an axle body perimeter edge remote from the central through-hole; a passive clutch disc, having a contact surface and a friction drive surface, and assembly ports for assembling elastic components outside of the engage drive area; centrifugal rollers, accommodated within the non-planar guiding slide grooves; and the driven devices includes a drive disc, formed with radially symmetric drive snap ports; a clutch shell, having a tubular inner wall, a surrounding outer wall and a connection wall; wherein the interior of the tubular inner wall has a central occlusive hole, and the internal surface of the surrounding outer wall has fixation parts.

Consequently, the saddle ride type vehicular dry clutch having passive clutch disc of co-axial fixed plane contact according to the present invention allows the drive bearing assembly to continue to rotate based on the power transmissions from the belt, and when the rotation speed reaches at a specific value, the radially allocated centrifugal rollers can be flung outwardly to abut against and closely contact the passive clutch disc which can further engage with the friction drive disc; since such elements are combined in a surface contact fashion, it is possible to effectively resolve the uneven lining contact surface issue and eliminate the coordinate structure using springs for controlling the fling distance of clutch counter-weights, thus avoiding the elasticity aging problem which may adversely affect the feature of uniform power transmissions. Once the drive disc starts to rotate synchronously, the clutch shell can acquire the needed power for rotations through transmissions of the fixation parts snap fixed with the drive snap ports, and further drive the for output axle with the acquired power by means of the central occlusive hole thus enabling the operations of the mechanic power equipment. Seeing that the object of the friction contact from the drive disc is the passive clutch disc, the surface engagement of large areas can be formed there between, the torque may not be undertaken on a single guide pin so as to reduce the risks of breakup or fractures caused by stress concentration issues or else the abrupt failure problem in the clutch. In addition, the passive clutch disc may not transfer the heat energy directly to the clutch shell, so the heat energy accumulation on the clutch shell can be reduced, thus effectively prolonging the life span of the whole dry clutch and ensuring the reliability and security thereof in use.

DETAILED DESCRIPTION OF THE ILLUSTRATED EMBODIMENTS

The aforementioned and other technical contents, aspects and effects in relation with the present invention can be clearly appreciated through the detailed descriptions concerning the preferred embodiments of the present invention in conjunction with the appended drawings; moreover, in each embodiment, the same components will be denoted with similar numbers.

Figure 1:
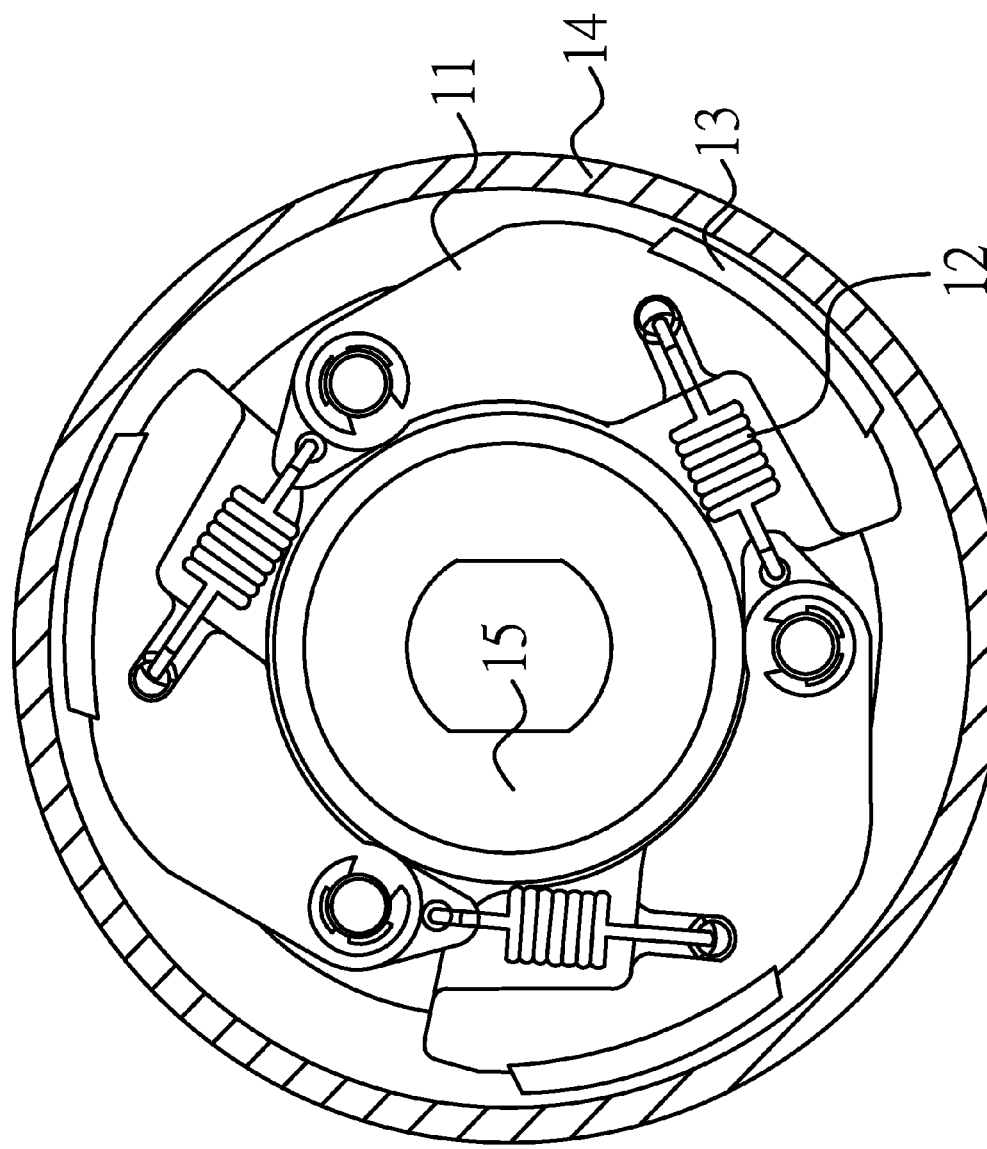
FIG. 1 shows a structural front view of a conventional clutch, illustrating the structural relationship between the clutch counter-weights and the springs.
Figure 2:
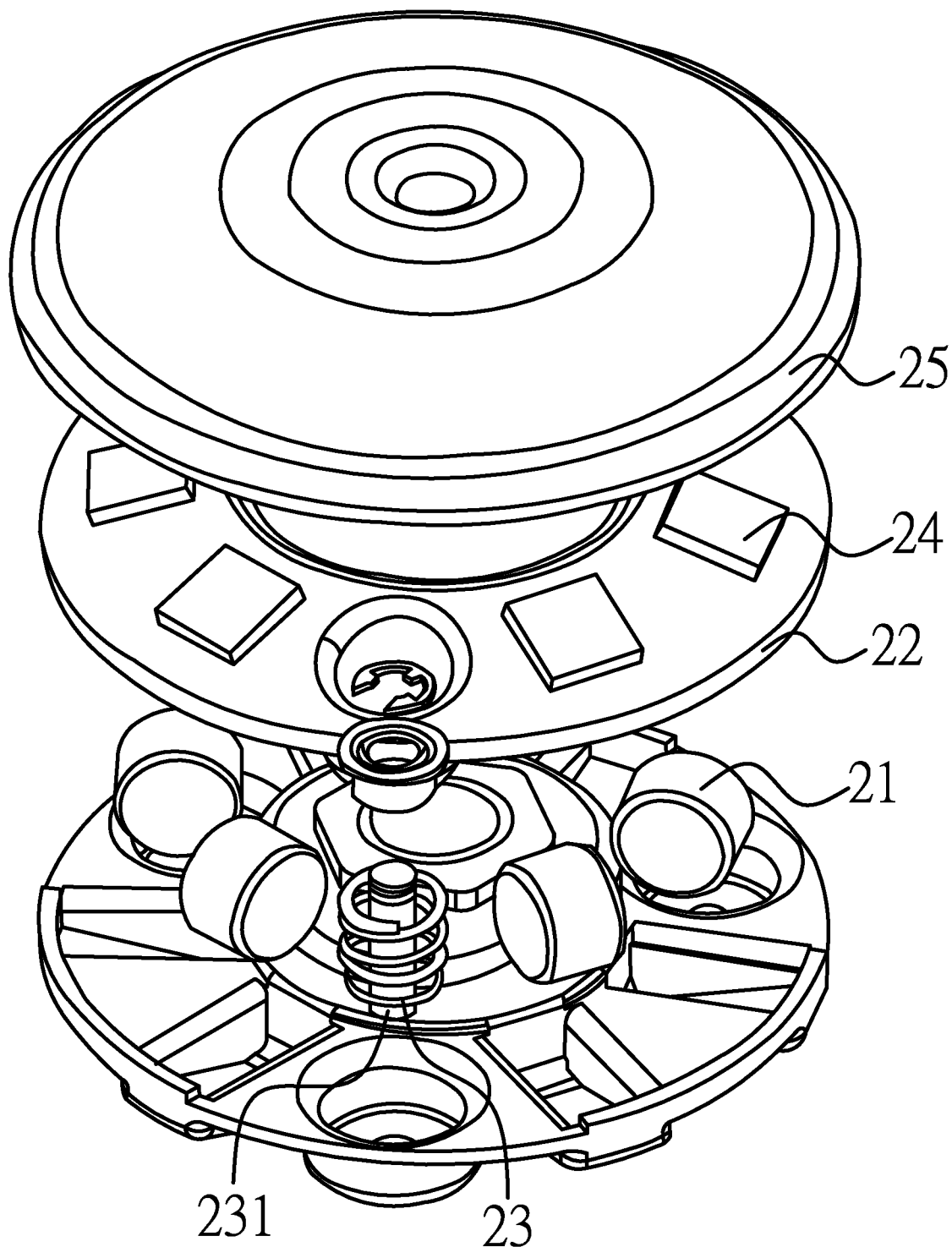
FIG. 2 shows a stereo exploded view of a currently available dry clutch, illustrating that the centrifugal rollers, after being flung away, squeeze and press the push-up disc such that the block-wise linings frictionally engage with the clutch shell.
Figure 3:
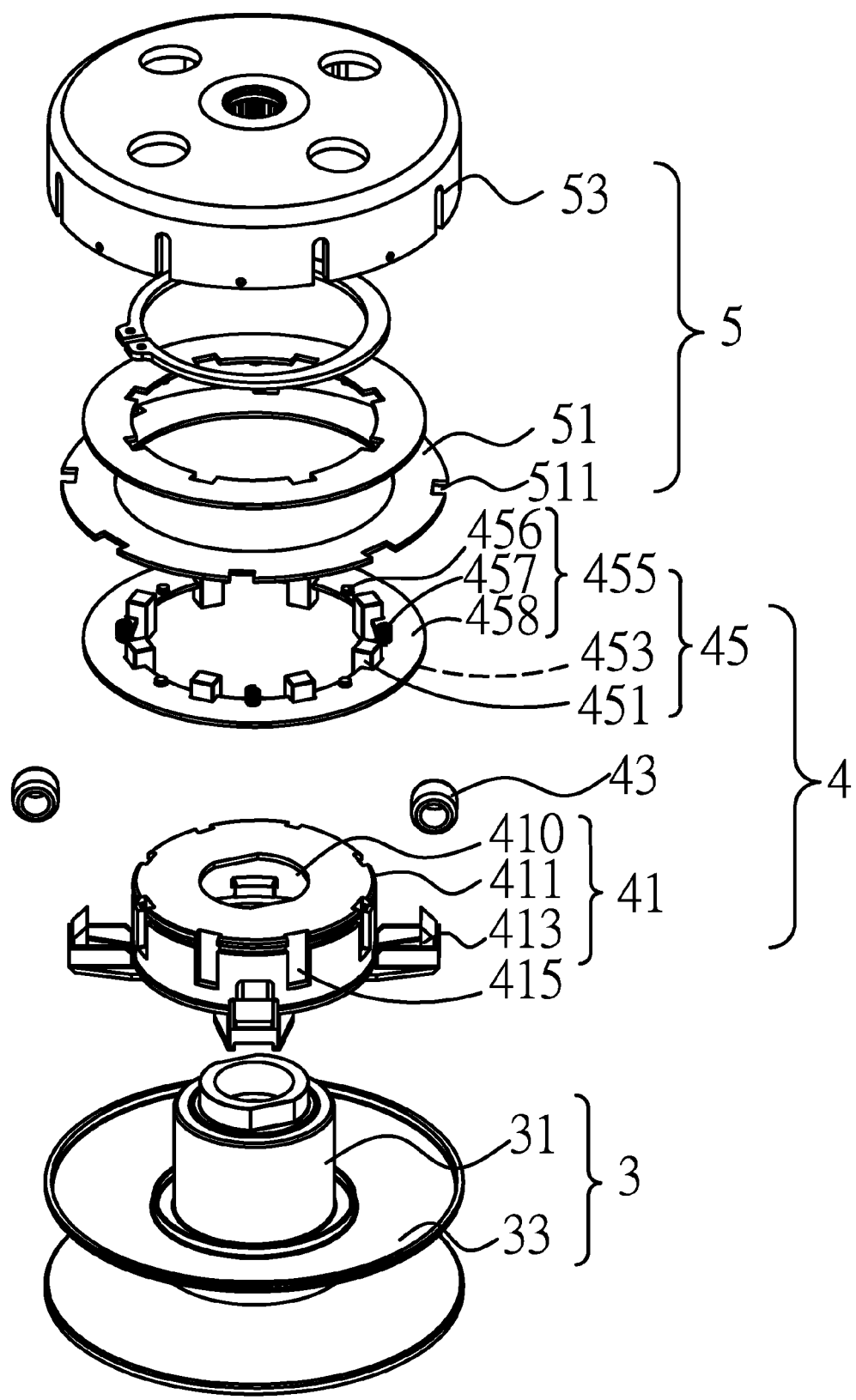
FIG. 3 shows a structural exploded view of a saddle ride type vehicular dry clutch according to the present invention.
Figure 7:
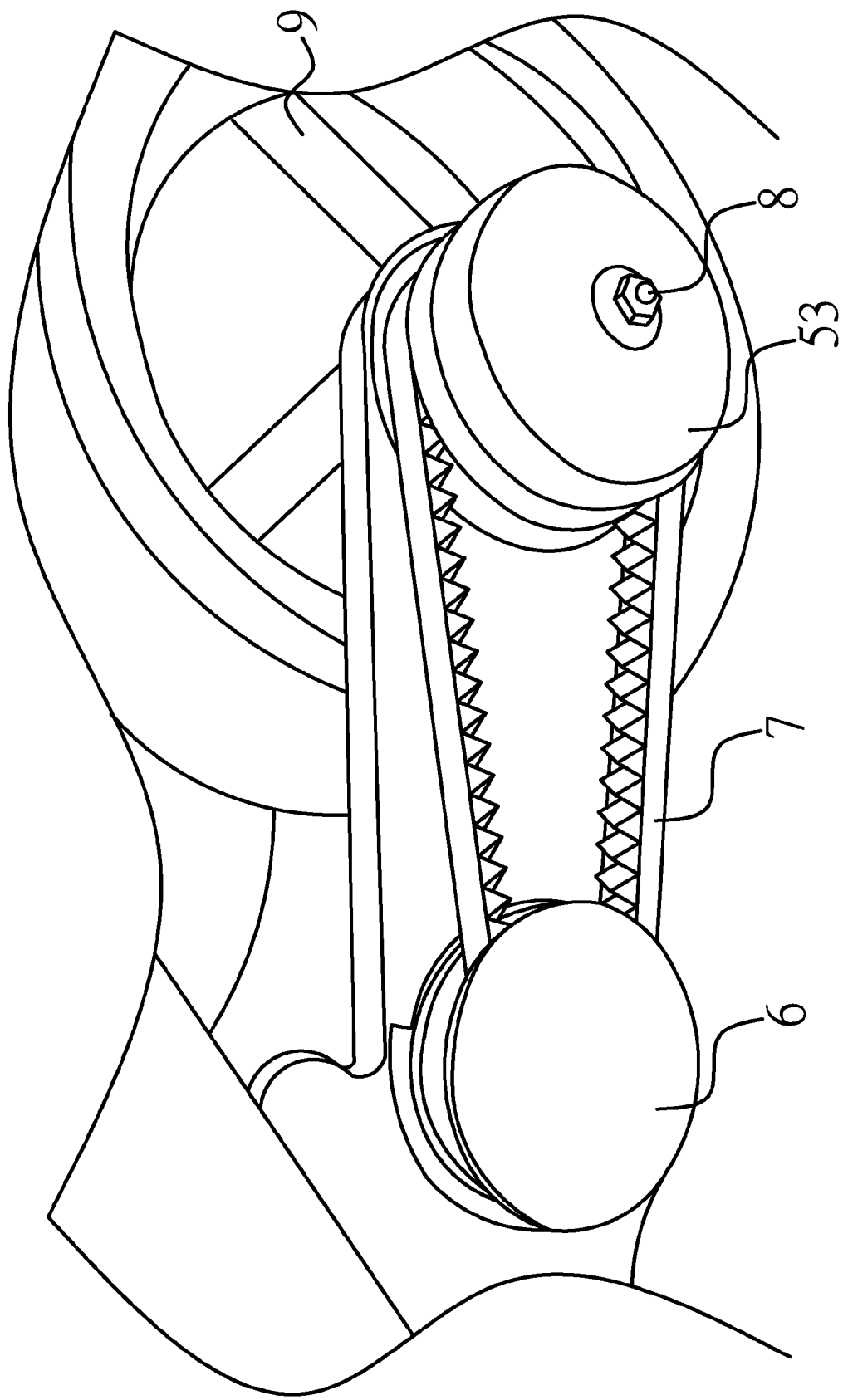
FIG. 7 shows a partial structural side view of a currently available motorcycle, depicting the output path of the vehicular power.

In the present embodiment, the dry clutch as shown in FIG. 7 is installed near the rear wheel of a motorcycle, whose clutch actions may be considered as the initialization switch with regards to the entire motorcycle. Also, as shown in FIG. 3, when the engine (not shown) maintains at a constant idle rotation speed (e.g., approximately 2000 RPM), the drive bearing assembly 3 conjunctively formed by the bearing body 31 as well as the active disc 33 synchronously running with the bearing body 31 undertakes the power transferred from the engine to rotate. After this, the rotation speed of the drive bearing assembly 3 determines whether the clutch device 4 should be collaboratively moved, in which the clutch device 4 is formed by sleeve installing a drive axle body 41 having a central through-hole 410 onto the bearing body 31 such that the drive axle body 41 can stably rotate along with the drive bearing assembly 3.

Figure 4:
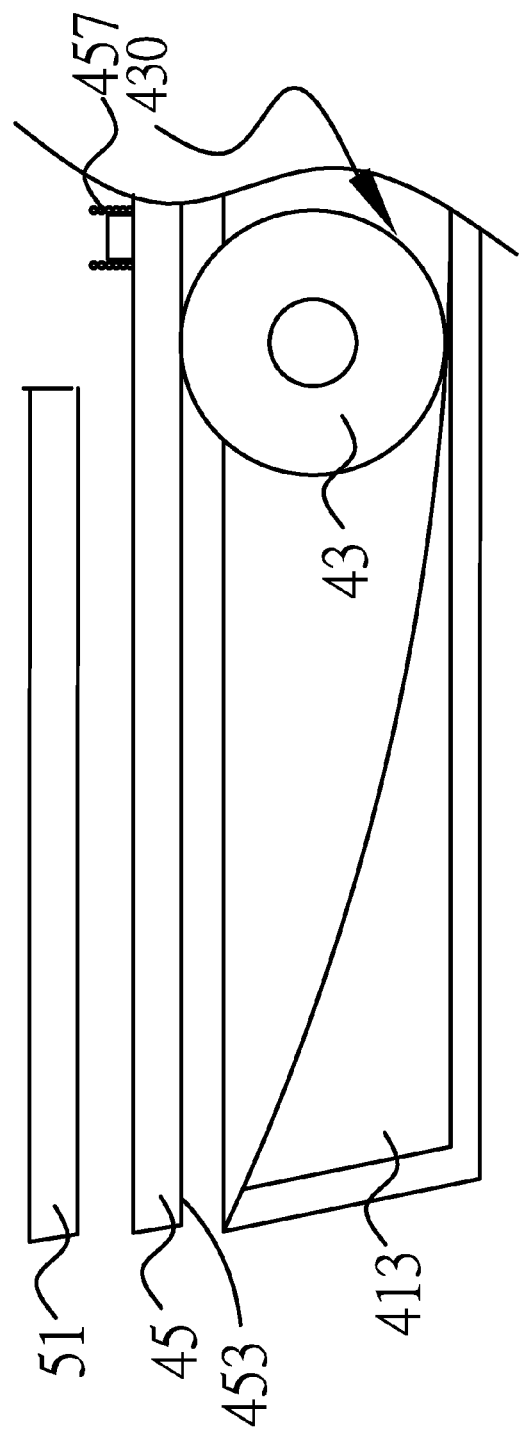
FIGS. 4 and 5 show lateral perspective views for the centrifugal roller of FIG. 3 located in the non-planar guiding slide groove, respectively illustrating that the centrifugal roller stagnates at the initial separation position and is flung outwardly and transit to a press move position in case of insufficient rotation speed and of higher rotation speed on the drive bearing assembly.

Besides, in the present embodiment, as referred in conjunction with FIG. 4, four non-planar guiding slide grooves 413 in a radially symmetric arrangement are configured on the drive axle body 41, and although such non-planar guiding slide grooves 413 are exemplified as exhibiting a simple higher-left-and-lower-right, uni-directionally gradient tilted shape, some slight turn-ups or variances may be still tolerable without restricting the implementation of the present invention. In each of the non-planar guiding slide grooves 413, a single centrifugal roller 43, for example, is respectively placed therein such that the centrifugal roller 43 can stay at an initial separation position 430 when the rotation speed of the engine has not exceeded the idle rotation speed, thus unable to touch the passive clutch disc 45 co-axially fixed at the outer edge of the drive axle body 41 thereby keeping the passive clutch disc 45 at a distance from the drive disc 51.

It should be noticed that the aforementioned "co-axially fixed" indicates that the axial centers of the drive axle body and the passive clutch disc are both located on the same axial line and mutually combined; therefore, to facilitate better expressions, such a combination relationship is defined as "co-axially fixed". Of course, those skilled ones in the art can conveniently appreciate that the number of centrifugal rollers placed within the non-planar guiding slide grooves needs not to be limited to be one single centrifugal roller in a non-planar guiding slide groove, but may be multiple centrifugal rollers in a non-planar guiding slide groove, or even configured as including six grooves with merely three mutually separated grooves among them having the centrifugal roller installed therein. Furthermore, the aforementioned non-planar guiding slide grooves may be exemplarily illustrated as simple slope grooves (herein the "simple slope" describes the grooves having a tilted line form upon observing them in a lateral orientation), which can be deemed as convenient variations in terms of the perspective structure without restricting the implementation of the present invention.

Also, an axle body perimeter edge 411 is configured on the drive axle body 41 at a position remote from the central through-hole 410, whose profile, in the present embodiment, is identical to the interior profile of the passive clutch disc 45 such that the passive clutch disc 45 can closely hoop the axle body perimeter edge 411 of the drive axle body 41. In order ensure the both to synchronously rotate, the axle body perimeter edge 411 in the present embodiment further includes, for example, eight recesses 415, with each of recesses 415 being formed in a vertical direction with respect to the plane of the Figure; correspondingly, the passive clutch disc 45 analogously has an equal number of fitting protrusive ribs 451, with each of the fitting protrusive ribs 451 being respectively fitted into the corresponding recess 415. The side of the passive clutch disc 45 at the lower part of the Figure is referred as the contact surface 453 allowing the centrifugal roller 43 to push and coerce, while the upper side opposite to the contact surface 453 is referred as the friction drive surface 455, with eight assembly ports 456, for example, being installed thereon; since such eight assembly ports 456 are configured on the inner side of the passive clutch disc 45 in the present embodiment, it is defined that the friction drive surface 455 has an engage drive area 458 formed on the outer part of the assembly ports 456. Herein the assembly ports 456 in the present embodiment are exemplified as protrusive columns thus allowing assemblage in joint with the elastic components 457 shown as springs.

It should be noticed that although the elastic components are illustrated as springs, other related structures like flexible plates or reeds enabling similar elastic forces can be utilized without restricting or hindering the implementations of the present invention with respect to technical characteristics. Certainly, those skilled ones in the art can convenient understand that the correspondence relationship between the elastic components and the assembly ports in terms of numbers may not coercively conform to a complete correspondence, so the implementation of the present invention can be still realized even multiple elastic components are placed within an assembly port. Meanwhile, it is also possible to have certain arbitrarily idle assembly ports and place the elastic components only in the remained assembly ports, so long as the shift distance of the passive clutch disc can be kept being equivalent without the issue of uneven engagement.

Figure 5:
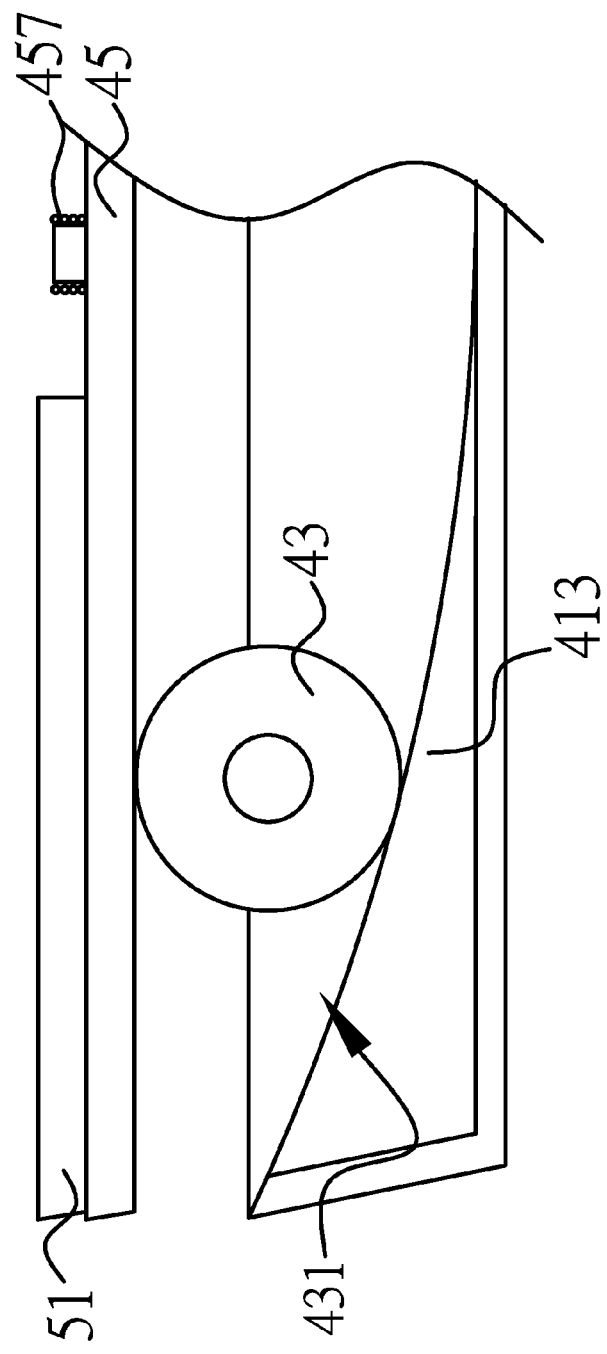

Next, referring to FIGS. 3 and 5, when the speed of the engine on the motorcycle exceeds the predetermined idle rotation speed, the centrifugal rollers 43 can be flung out from the initial separation position 430 in FIG. 4 toward the outer edge on the left side of the Figure, and, as the centrifugal rollers 43 flung toward the outside then moving and reaching at the press move position 431, it can start to push the passive clutch disc 45 to move up toward the top of the Figure such that the engage drive area 458 of the friction drive surface 455 faces up toward the top of the Figure thereby abutting against the drive disc 51 of the passive device 5 in a face contact fashion and driving it to rotate synchronously. Since the combination of the passive clutch disc 45 and the drive disc 51 according to the present invention is achieved through a large area, its relative stability can be ensures, and even certain tolerances may exist during the formation of each centrifugal roller 43 or the non-planar guiding slide groove 413, due to the rotation of the drive axle body 41, the centrifugal rollers 43 worn off more can be projected farther because of inertial effect, thus providing the same push force onto the contact surface 453 of the passive clutch disc 45 so as to maintain the balance in the surface engagement between the passive clutch disc 45 and the drive disc 51. More conservatively speaking, even some slight tilt does exist in the surface engagement between the passive clutch disc 45 and the drive disc 51, after certain trifling abrasions, new balance can be acquired nonetheless thus retaining the intended large area contact so as to resolve the problem found in currently available technologies.

Figure 6:
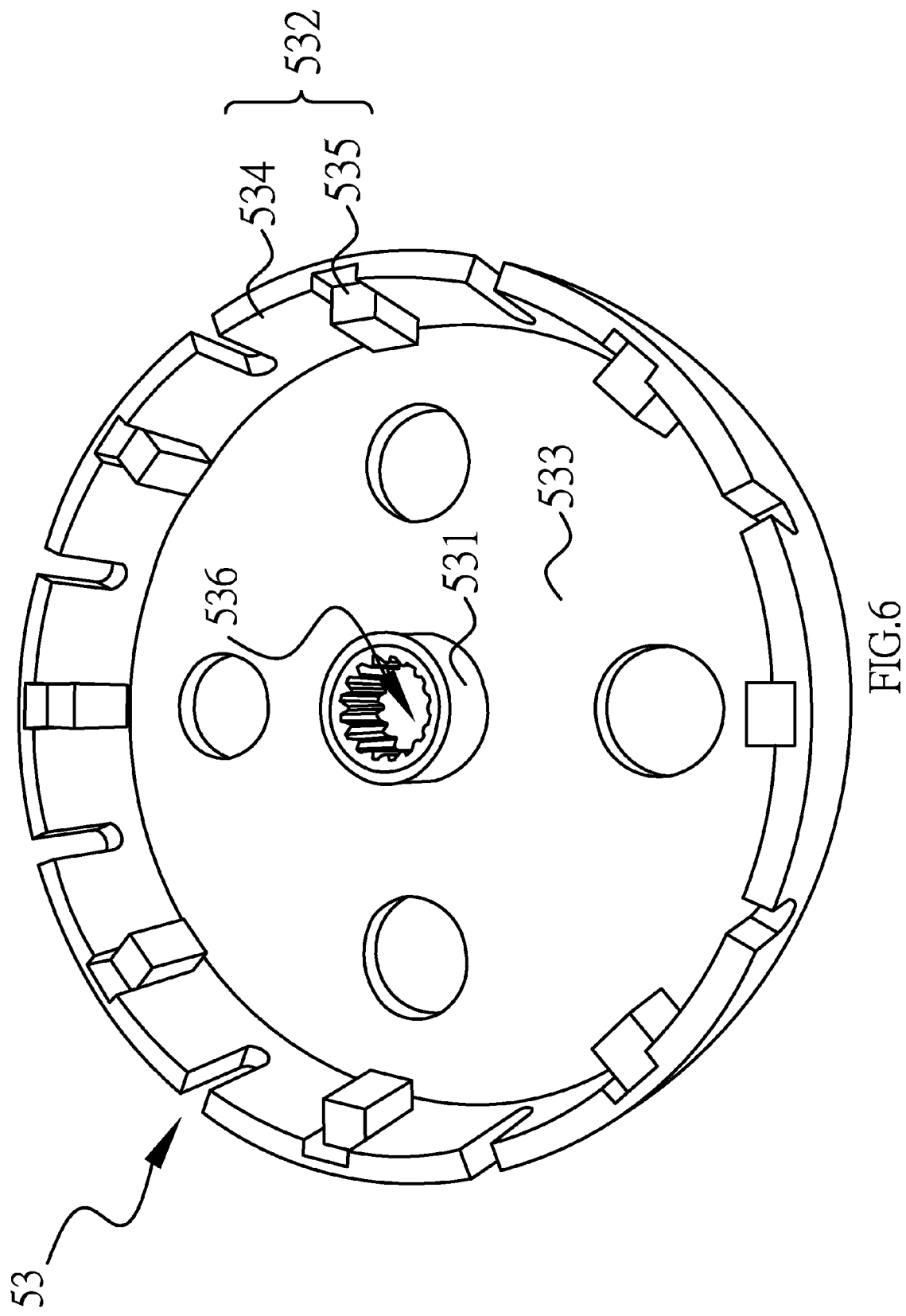
FIG. 6 shows a stereo view of the clutch shell in FIG. 3, illustrating the structural characteristics thereof.

The clutch shell configured in snap combination with the drive disc is shown in FIG. 6, and FIG. 3 is herein conjunctively referred for better understanding. The clutch shell 53 in FIG. 6 is presented by vertically turning over the graph in FIG. 3, in which the clutch shell 53 is provided by combining the tubular inner wall 531 located at the axial center, the surrounding outer wall 532 remote from the tubular inner wall 531, and the connection wall 533 linking the tubular inner wall 531 and the surrounding outer wall 532. To facilitate better power transmission performance, the internal surface 534 of the surrounding outer wall 532 in the present embodiment further includes eight fixation parts 535 exemplified as industrial plastic buttons such that the drive disc 51 can fixedly occlude by the same quantity of radially symmetric drive snap ports 511. Apparently, because it is further via the drive disc 51 to enable the clutch shell 53 to rotate, the heat energy generated by frictions between the passive clutch disc 45 and the drive disc 51 may not easily reach at the clutch shell 53, which also ensures the expansion-retraction effect may simply affect the consumable passive clutch disc 45 and the drive disc 51 to a large extent, rather than directly interfering with the clutch shell 53, thus effectively prolonging the life span of the clutch.

Furthermore, refer conjunctively to FIGS. 3, 6 and 7, wherein, through the rotations of the pulley disc 6, the power from the engine drags the transmission belt 7 on the pulley disc 6 to transfer the power to the saddle ride type vehicular dry clutch (not denoted). Once the rotation speed exceeds the specified idle speed, the passive clutch disc 45 can be coerced by the centrifugal rollers 43 to frictionally contact the drive disc 51 thereby further driving the clutch shell 53 to synchronously spin so as to, with the assistance of the central occlusive hole 536 formed on the interior of the tubular inner wall 531, occlude onto the force output axle 8 herein exemplified as a transmission axle, such that the force output axle 8 extends through the central through-hole 410 in an axial direction under the support of the drive bearing assembly 3 capable of relatively rotating to link and bring the wheel frame 9 on the rear wheel of the motorcycle via a speed reducer gear thus offering the required kinetic energy for vehicular movement to drive the motorcycle to advance. Certainly, in terms of the jointed fixation relationship between the aforementioned fixation part and the drive snap ports, those skilled ones in the art can apply any possible means for such a fixation to achieve stable and secured occlusions without limiting the implementation of the present invention. Moreover, seeing that the non-planar guiding slide grooves on the active disc are arranged in a radially symmetric fashion, this can guarantee the torque generated at high speed rotation will not be singly accumulated on any one of the non-planar guiding slide grooves thus greatly reducing the possibility of structural damages.

Figure 8:
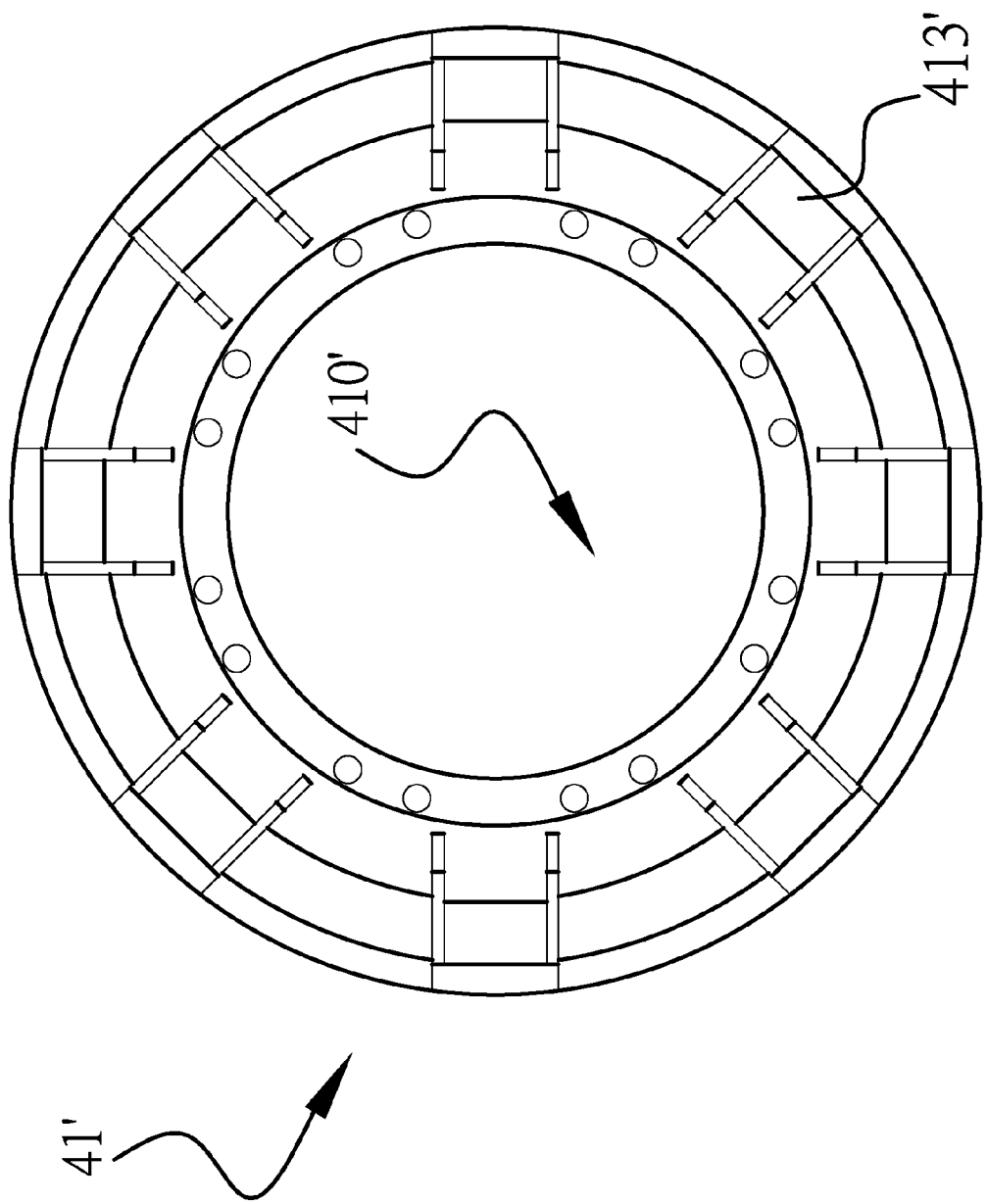
FIG. 8 shows a top view for a second embodiment of the non-planar guiding slide groove according to the present invention.
Figure 9:
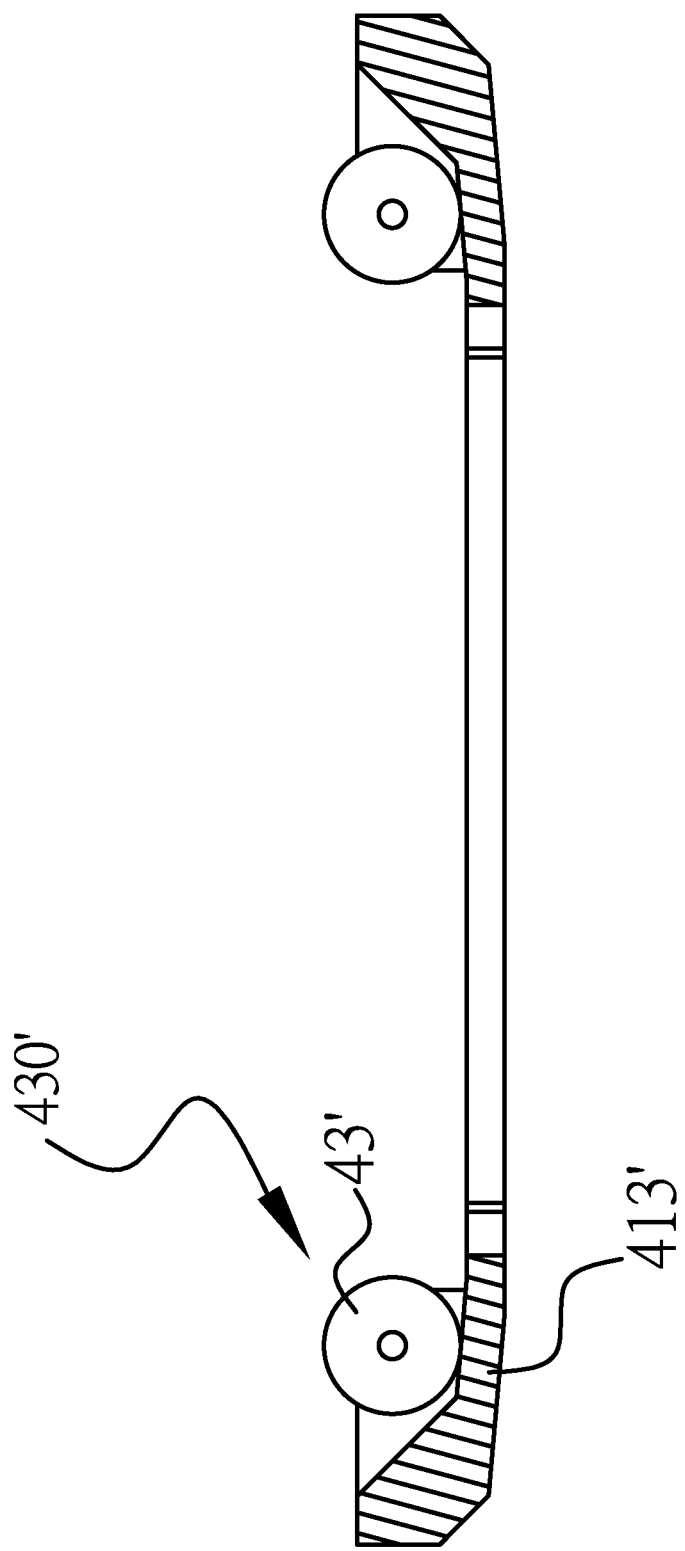
FIG. 9 shows a lateral cross-section view of FIG. 8, similarly illustrating that the centrifugal roller stagnates at the initial separation position in case of insufficient rotation speed.

Of course, those skilled ones in the art can conveniently understand that the numbers and shapes previously set forth with regard to the guiding slide grooves and centrifugal rollers in the aforementioned embodiment are by no means restrictive. A second preferred embodiment according to the present invention is shown in FIGS. 8 and 9, wherein the drive axle body 41' includes eight radially distributed non-planar guiding slide grooves 413', the portion on each of such non-planar guiding slide grooves 413' near the central through-hole 410' is flattened, while the opposite portion remote from the central through-hole 410' has a turn shown in FIG. 9 as a tilted plane in order to clearly differentiate the operation states when the centrifugal roller 43' being located at the initial separation position 430' and at the push move position (not denoted).

Nevertheless, the aforementioned descriptions simply illustrate the preferred embodiments of the present invention, rather than limiting the scope for the implementations of the present invention thereto; hence, all effectively equivalent changes, modifications or alternations made based on the Claims as well as the contents of the specification in the present invention are deemed to be covered within the scope of the present invention.

What is claimed is:

1. A saddle ride type vehicular dry clutch having passive clutch disc of co-axial fixed plane contact, used for seamlessly undertaking the drives from a set of drive bearing assembly, in which the drive bearing assembly includes a bearing body and an active disc synchronously rotating with the bearing body, and the saddle ride type vehicular dry clutch comprises:

a clutch device, including:
  a drive axle body formed with a central through-hole sliding over the bearing body, having an axle body perimeter edge formed around the central through-hole, and formed with a plurality of radially symmetric non-planar guiding slide grooves;
  a passive clutch disc, co-axially connected to the drive axle body, having a contact surface and a friction drive surface opposite to the contact surface, said friction drive surface being formed with an engage drive area, and a plurality of assembly ports being formed in areas outside of the engage drive area for respectively assembling a plural elastic components; and
  a plurality of centrifugal rollers, radially and symmetrically disposed inside the non-planar guiding slide grooves respectively, such that, when the drive bearing assembly reaches a predetermined rotation speed, the centrifugal rollers can be centrifugally flung from an initial separation position to a press move position;
and a driven device, including:
  at least one drive disc, which engages to and driven by the engage drive area on the passive clutch disc when the plurality of centrifugal rollers are located in the press move position, in which the at least one drive disc is formed with a plurality of radially symmetric drive snap ports; and
  a clutch shell, having a tubular inner wall, a surrounding outer wall and a connection wall joining the tubular inner wall and the surrounding outer wall, in which a central occlusive hole is formed on the interior of the tubular inner wall for occluding and driving a force output axle attached to the clutch shell, and the internal surface of the surrounding outer wall has multiple fixation parts protruding inwardly from an internal surface of the surrounding outer wall and movably engaging the drive snap ports, wherein the clutch shell rotates after the passive clutch disc engages the at least one drive disc.

2. The saddle ride type vehicular dry clutch having passive clutch disc of co-axial fixed plane contact according to claim 1, wherein the non-planar guiding slide grooves are grooves of gradually changing slopes.

3. The saddle ride type vehicular dry clutch having passive clutch disc of co-axial fixed plane contact according to claim 1, wherein multiple recesses are formed on the axle body perimeter edge of the drive axle body, and the passive clutch disc has multiple fitting protrusive ribs respectively and correspondingly combined with the recesses.

4. The saddle ride type vehicular dry clutch having passive clutch disc of co-axial fixed plane contact according to claim 1, wherein the elastic components are springs.

5. The saddle ride type vehicular dry clutch having passive clutch disc of co-axial fixed plane contact according to claim 1, wherein the assembly ports are columns.

6. The saddle ride type vehicular dry clutch having passive clutch disc of co-axial fixed plane contact according to claim 1, wherein the number of the elastic components corresponds to the counterpart of the assembly ports.

7. The saddle ride type vehicular dry clutch having passive clutch disc of co-axial fixed plane contact according to claim 1, wherein the force output axle is a transmission axle.

8. The saddle ride type vehicular dry clutch having passive clutch disc of co-axial fixed plane contact according to claim 1, wherein the fixation parts are industrial plastic buttons.

* * * * *